(12) United States Patent
Collot et al.

(10) Patent No.: US 9,365,353 B2
(45) Date of Patent: Jun. 14, 2016

(54) LONGITUDINAL MEMBER FOR A CONVEYOR, AND ASSEMBLY COMPRISING A LONGITUDINAL MEMBER OF THIS KIND AND A PLURALITY OF CABLE-CARRYING AND COVER-SECURING HOOKS

(71) Applicant: Savoye, Dijon (FR)

(72) Inventors: Patrick Collot, Corberon (FR); Adrien Mariusse, Chalon sur Saone (FR)

(73) Assignee: SAVOYE, Dijon (FR)

( * ) Notice: Subject to any disclaimer, the term of this patent is extended or adjusted under 35 U.S.C. 154(b) by 0 days.

(21) Appl. No.: 14/401,787

(22) PCT Filed: May 15, 2013

(86) PCT No.: PCT/EP2013/060094
§ 371 (c)(1),
(2) Date: Nov. 17, 2014

(87) PCT Pub. No.: WO2013/171285
PCT Pub. Date: Nov. 21, 2013

(65) Prior Publication Data
US 2015/0166263 A1    Jun. 18, 2015

(30) Foreign Application Priority Data
May 16, 2012  (FR) ..................................... 12 54535

(51) Int. Cl.
*B65G 21/20*  (2006.01)
*B65G 13/12*  (2006.01)
*B65G 13/11*  (2006.01)

(52) U.S. Cl.
CPC ............ *B65G 21/2072* (2013.01); *B65G 13/11* (2013.01); *B65G 13/12* (2013.01)

(58) Field of Classification Search
CPC ........ B65G 13/11; B65G 13/12; B65G 21/02; B65G 21/06; B65G 21/2072
See application file for complete search history.

(56) References Cited

U.S. PATENT DOCUMENTS 3,540,561 A * 11/1970 Heptner ................. B65G 13/11
193/35 R
4,399,908 A *  8/1983 Gunti ..................... B65G 21/06
198/789

(Continued)

FOREIGN PATENT DOCUMENTS

DE    202005020117 U1 *  5/2006 ............. B65G 13/11
JP       H10181829 A        7/1998
JP      2003292136 A       10/2003

OTHER PUBLICATIONS

International Search Report dated Nov. 20, 2013 for corresponding International Application No. PCT/EP2013/060094, filed May 15, 2013.

(Continued)

*Primary Examiner* — Leslie A Nicholson, III
*Assistant Examiner* — Keith R Campbell
(74) *Attorney, Agent, or Firm* — David D. Brush; Westman, Champlin & Koehler, P.A.

(57) ABSTRACT

A longitudinal member is provided for a load conveyor, including a main body having a plurality of holes suitable for receiving one end of a load supporting element. The main body has a C-section with first and second side flanges extending substantially perpendicularly from first and second ends of a central web. The longitudinal member includes a guiding element extending from the second side flange. The longitudinal member is reversible. In a first direction, the guiding element is located above the main body, the cavity opens opposite the load supporting elements and each of a first group of holes receives one end of one of the load supporting elements. In a second direction, the guiding element is located below the main body, the cavity opens opposite the load supporting elements and each of a second group of holes receives one end of one of the load supporting elements.

11 Claims, 5 Drawing Sheets

(56) References Cited

U.S. PATENT DOCUMENTS

| | | | | |
|---|---|---|---|---|
| 5,361,894 A | * | 11/1994 | Solcz | B65G 21/06 198/790 |
| 6,161,681 A | * | 12/2000 | Kalm | B65G 39/12 198/781.1 |
| 6,830,146 B1 | | 12/2004 | Scully et al. | |
| 8,590,697 B2 | * | 11/2013 | Lim | B65G 21/02 198/860.1 |
| 2011/0303434 A1 | | 12/2011 | Wheeler et al. | |

OTHER PUBLICATIONS

English translation of the International Written Opinion dated Nov. 20, 2013 for corresponding International Application No. PCT/EP2013/060094, filed May 15, 2013.

* cited by examiner

LONGITUDINAL MEMBER FOR A CONVEYOR, AND ASSEMBLY COMPRISING A LONGITUDINAL MEMBER OF THIS KIND AND A PLURALITY OF CABLE-CARRYING AND COVER-SECURING HOOKS

1. CROSS-REFERENCE TO RELATED APPLICATIONS

This application is a Section 371 National Stage Application of International Application No. PCT/EP2013/060094, filed May 15, 2013, the content of which is incorporated herein by reference in its entirety, and published as WO 2013/171285 on Nov. 21, 2013, not in English.

2. FIELD OF THE INVENTION

The field of the invention is that of the conveyance of heavy or light, isolated loads. More specifically, the invention pertains to a longitudinal member for a load conveyor, especially but not exclusively for a roller conveyor (using free rollers and motorized rollers), wheel conveyors, band conveyors, chain conveyors (for example pallet chain conveyors), etc.

The invention can be applied especially but not exclusively in the field of production or logistics.

3. TECHNOLOGICAL BACKGROUND

We shall strive more particularly here below in the document to describe the problems and issues existing in the case of a roller conveyor. The invention is naturally not restricted to this particular type of conveyor but is of interest for any conveyor having to cope with a proximate or similar problems and issues.

Classically, a roller conveyor comprises two longitudinal members assembled by cross members or cross-pieces (also called transverse braces), the entire unit constituting a rigid frame.

Conveyor rollers are positioned inside this rigid frame in order to form a payload conveying zone. To this end, each longitudinal member has a plurality of holes each suited to receiving a shaft of one of the rollers.

The driving of all the conveyance rollers is ensured for example by a motorized roller which drives the other rollers in cascade (two adjacent rollers being linked to a belt, or to any other driving means).

Two types of implementation of a roller conveyor can be distinguished, depending on whether or not the longitudinal members fulfill a function of guiding a load transported by the rollers.

A first known technique uses only simple longitudinal members (without an integrated side guide rail) and:
  in the implementation with the guiding function, a side guide rail (i.e. a mechanical guiding element) is attached to each longitudinal member and extends beyond a running surface of the rollers;
  in the implementation without the guiding function, the simple longitudinal members are used without side guide rails. No part of the longitudinal member (nor any element fastened to this longitudinal member) therefore extends beyond the running surface of the rollers. This makes it possible to transport loads wider than the payload width of the conveyor.

One major drawback of this first prior-art technique is that, in the implementation with the guiding function, it requires substantial mounting time because a side guide rail needs to be fastened to each single longitudinal member. This is all the more inconvenient as the mounting operations are very often performed on the client's site (the final installation site).

Another drawback of this first prior-art technique is that it requires the manufacturing and management (including in terms of storage and transport up to the customer's site) of firstly the simple longitudinal members and secondly the side guide rails.

A second prior-art technique uses longitudinal members that are more complex, integrating a side guide rail for the implementation with the guiding function.

One major drawback of this second prior-art technique is that it requires the manufacture and management (including in terms of storage and transport up to the customer's site) of two types of longitudinal members (namely simple longitudinal members without side guide rail and more complex longitudinal members with side guide rail).

Another drawback, common to the first and second prior-art techniques mentioned here above, is that the mounting time is further increased because it requires the fastening, to each longitudinal member, of a cable rack or a cable-supporting chute. This is especially cumbersome since, as already mentioned further above, the mounting operations are often carried out on the client's site.

Another drawback common to the first and second prior-art techniques mentioned here above is that it is not easy to personalize the appearance of the conveyor which is related, in the first and second prior-art techniques, to the appearance of the longitudinal members and the cable racks or the cable-supporting chutes.

4. SUMMARY OF THE INVENTION

One particular embodiment of the invention proposes a longitudinal member for a load conveyor comprising a main body comprising a plurality of holes each adapted to receiving one end of a load-supporting element, characterized in that the main body possesses a C-shaped profile defining a cavity intended for receiving at least one cable and/or at least one element for driving the conveyor, said C-shaped profile comprising a central part, a first lateral arm extending substantially perpendicularly from a first end of the central part and a second lateral arm extending substantially perpendicularly from a second end of the central part. The longitudinal member comprises a guiding element extending from the second lateral arm of the main body. The main body comprises, in the central part of the C-shaped profile: —a first set of holes leading into the cavity and situated at a first predetermined distance from the second lateral arm of the main body; and —a second set of holes leading into the cavity and situated at a second predetermined distance from the first lateral arm of the main body. The longitudinal member is reversible and has two mounting directions:
  a first direction in which the guiding element is situated above the main body; the cavity opens out opposite to the load-supporting elements; and each of the holes of the first set can receive one end of one of the load-supporting elements;
  a second direction in which the guiding element is situated below the main body; the cavity opens out opposite to the load-supporting elements; and each of the holes of the second set can receive one end of one of the load-supporting elements.

The general principle of this particular embodiment of the invention consists therefore in proposing a longitudinal member that integrates a guiding element (also called a side guide rail) and is reversible, with a first mounting direction in which the longitudinal member (and more specifically the guiding element integrated into the longitudinal member) fulfills the guiding function, and a second mounting direction in which the longitudinal member does not fulfill the guiding function. The choice of the direction of assembly is made at the time of joining of the mechanical structure of the conveyor.

Thus, this particular embodiment of the invention relies on a wholly novel and inventive approach enabling the use of only one type of longitudinal member without in any way requiring the mounting (the fastening) on the longitudinal member of a mechanical guidance part (side guide rail) if the conveyor has to fulfill the guiding function. Thus, the time taken to mount the conveyor is reduced. The costs of manufacturing and storage of the longitudinal members, and therefore of the conveyors, are also reduced (reducing the number of types of longitudinal members enables the large-scale consolidation of purchases, and hence the consolidation of the costs of material).

The nature of the load-supporting elements depends on the type of conveyor. For example, the load-supporting elements are:
  in the case of a roller conveyor: rollers;
  in the case of a wheel conveyor: shafts supporting the wheels;
  in the case of a belt conveyor: a control drum, an end roller and a carrier chassis (with a slider bed that supports the belt);
  in the case of a chain conveyor: a chain-carrying chassis; etc.

No additional mechanical element of the cable rack or cable-supporting chute type is necessary. It is the cavity of the main body of the longitudinal member that receives the cable or cables that run along the conveyor, as well as the driving elements of the conveyor (electronic card for example).

Since the holes (each adapted to receiving one end of a load-supporting element) lead into the cavity, it is easier to dismantle the load-supporting elements (rollers in the case of a roller conveyor).

According to one particular characteristic, the longitudinal member is a profile part comprising the main body and the guide element.

The longitudinal member (main body and the guide element) can thus be manufactured at low cost, for example by folding a metal sheet.

In another particular embodiment of the invention, an assembly is proposed comprising a longitudinal member as mentioned here above (in any one of the embodiments presented here above): and a plurality of cable-carrying hooks fastened to the longitudinal member, inside the cavity. In addition, the main body of the longitudinal member comprises, in the central part of the C-shaped profile:
  a third set of holes, leading into the cavity, situated at a third predetermined distance (H1'+H1) from the second lateral arm of the main body, and each intended to receive an element for fastening one of the cable-wearing hooks when the longitudinal member is mounted in the first direction; and
  a fourth set of holes, leading into the cavity, situated at a fourth predetermined distance (H2'+H2) from the first lateral arm of the main body, and each intended to receive an element for fastening one of the cable-carrying hooks when the longitudinal member is mounted in the second direction.

Thus, the plurality of cable-carrier hooks facilitates and makes it possible to organize the support of the cable or cables to be inserted into the cavity of the main body of the longitudinal member.

According to one particular characteristic, at least one of the cable-carrier hooks is fastened to the longitudinal member by a fastening element also serving to fasten the longitudinal member to a cross-piece or strap.

Thus, the cross-pieces (constituting, with the longitudinal members, the rigid frame of the conveyor) are used to fasten the cable-carrier hooks to the longitudinal members.

According to one particular characteristic, the assembly comprises at least one cover adapted so as to get fastened to the plurality of cable-carrier hooks and close the cavity.

The cover makes it possible to close the cavity. There is no other functional role. This makes it easy to personalize the appearance of the conveyor, for example by choosing the appearance (color, design, text, etc) of the cover.

According to one particular characteristic, the holes of the first set are aligned with a first straight line, the holes of the second set are aligned with a second straight line, the holes of the third set are aligned with a third straight line, the holes of the fourth set are aligned with a fourth straight line and the distance between the first and third straight lines is equal to the distance between the second and fourth straight lines.

Thus, if two adjoining longitudinal members are not mounted in the same direction (i.e. with one fulfilling the guiding function while the other does not), there is no vertical offset between the cable-carrier hooks fastened to one of the longitudinal members, and cable-carrier hooks fastened to the other longitudinal member. There is therefore continuity between two covers each fastened to one of the two adjoining longitudinal members. It is even possible to mount a cover so that it straddles one of the two adjoining longitudinal members.

In another particular embodiment of the invention, an assembly is proposed comprising: a longitudinal member such as is described here above (in any one of the embodiments presented here above); and at least one guiding part fastened to the longitudinal member. In addition, the main body of the longitudinal member comprises:
  in the second lateral arm of the main body, a fifth set of holes leading into the cavity, and each intended to receive an element for fastening said at least one guiding part, attached by the top to the longitudinal member, when the longitudinal member is mounted in the first direction;
  and in the first lateral arm of the main body, a sixth set of holes leading into the cavity and each intended to receive an element for fastening said at least one guiding part, attached by the top to the longitudinal member when the longitudinal member is mounted in the second direction.

Thus, four types of mounting can be distinguished:
  mounting with longitudinal member fulfilling the guiding function (through the guiding element integrated into the longitudinal member) and with an attached guiding part fulfilling an additional guiding function at another vertical level;
  mounting with longitudinal member fulfilling the guiding function (through the guiding element integrated into the longitudinal member) and without attached guiding part;
  mounting with longitudinal member not fulfilling the guiding function, and with an attached guiding part fulfilling a guiding function at another vertical level;
  mounting with longitudinal member not fulfilling the guiding function and without an attached guiding part.

According to one particular characteristic, the holes of the first set are aligned with a first straight line, the holes of the second set are aligned with a second straight line, the holes of the fifth set are aligned with a fifth straight line, the holes of the sixth set are aligned with a sixth straight line, and the distance between the first and fifth straight lines is equal to the distance between the second and sixth straight lines.

This ensures continuity (without vertical offset) between two guiding parts, each attached to one longitudinal member of a pair of adjoining longitudinal members which are not mounted in the same direction. This also provides for continuity (no vertical offset) for a guiding part so as to straddle two adjoining longitudinal members that are not mounted in the same direction. It is therefore possible to use only one type of attached guiding part.

In another particular embodiment of the invention, an assembly is proposed comprising: a longitudinal member as described here above (in any one of the embodiments presented here above); and at least one leg structure fastened to the longitudinal member. In addition, the main body of the longitudinal member comprises:

- in the first lateral arm of the main body, a seventh set of holes leading into the cavity and each intended to receive an element for fastening said at least one leg structure, attached by the underside to the longitudinal member, when the longitudinal member is mounted in the first direction; and
- in the second lateral arm of the main body, an eighth set of holes, leading into the cavity and each intended to receive a fastening element for fastening said at least one leg structure, attached by the underside to the longitudinal member, when the longitudinal member is mounted in the second direction.

According to one particular characteristic, the holes of the first set are aligned with a first straight line, the holes of the second set are aligned with a second straight line, the holes of the seventh set are aligned with a seventh straight line, the holes of the eighth set are aligned with an eighth straight line, and the distance between the first and seventh straight lines is equal to the distance between the second and eighth straight lines.

This ensures continuity (without vertical offset) between two leg structures, each fastened to one longitudinal member of a pair of adjoining longitudinal members that are not mounted in the same direction. It is therefore possible to use only one type of leg structure.

According to one particular characteristic, the sixth set of holes and the seventh set of holes coincide and the fifth set of holes and the eighth set of holes coincide.

Thus, the number of holes is reduced and the manufacture of the longitudinal members is simplified.

5. LIST OF FIGURES

Other features and advantages of the invention shall appear from the following description, given by way of an indicative and non-exhaustive example and from the appended figures, of which.

6. DETAILED DESCRIPTION

Here below in the description, by way of an example only, it shall be assumed that each conveyor is a roller conveyor comprising two longitudinal members joined by two cross-pieces, as well as conveyor rollers. For example, one of the rollers is motorized and drives the other free rollers by a cascaded mounting (two adjacent rollers being connected by a belt, or any other driving means).

It is clear however that the invention is not limited to this type of load conveyor but can be applied to other types of conveyors: wheel conveyors, belt conveyors, chain conveyors, etc.

In all the figures of the present document, the identical elements are designated by a same number reference (especially reference 4 for the rollers, reference 5 for the belt, reference 6 for the cross-pieces, reference 7 for the cable-carrier hooks, reference 8 for the cover).

The general principle of the invention consists in using a single type of longitudinal member 70 that is reversible and can be mounted in a first direction to fulfill a guiding function or a second direction in order not to fulfill the guiding function. In other words, all the longitudinal members that appear in the different figures are identical.

Four ways can be distinguished for mounting the longitudinal member 70 of the invention, in taking account on the one hand of the direction (with guiding function ("a") or without guiding function ("s")) along which it is mounted and secondly the side (to the left ("g") or to the right ("d")) of the conveyor on which it is mounted:

- when it is mounted in the direction where it fulfills the guiding function and to the left, the longitudinal member is referenced $70_{a,g}$ in the figures;
- when it is mounted in the direction where it does not fulfill the guiding function and to the left, the longitudinal member is referenced $70s_{s,g}$ in the figures;
- when it is mounted in the direction where it fulfills the guiding function and to the right, the longitudinal member is referenced $70_{a,d}$ in the figures;
- when it is mounted in the direction where it does not fulfill the guiding function and to the right, the longitudinal member is referenced $70s_{s,d}$ in the figures.

Figure 8:
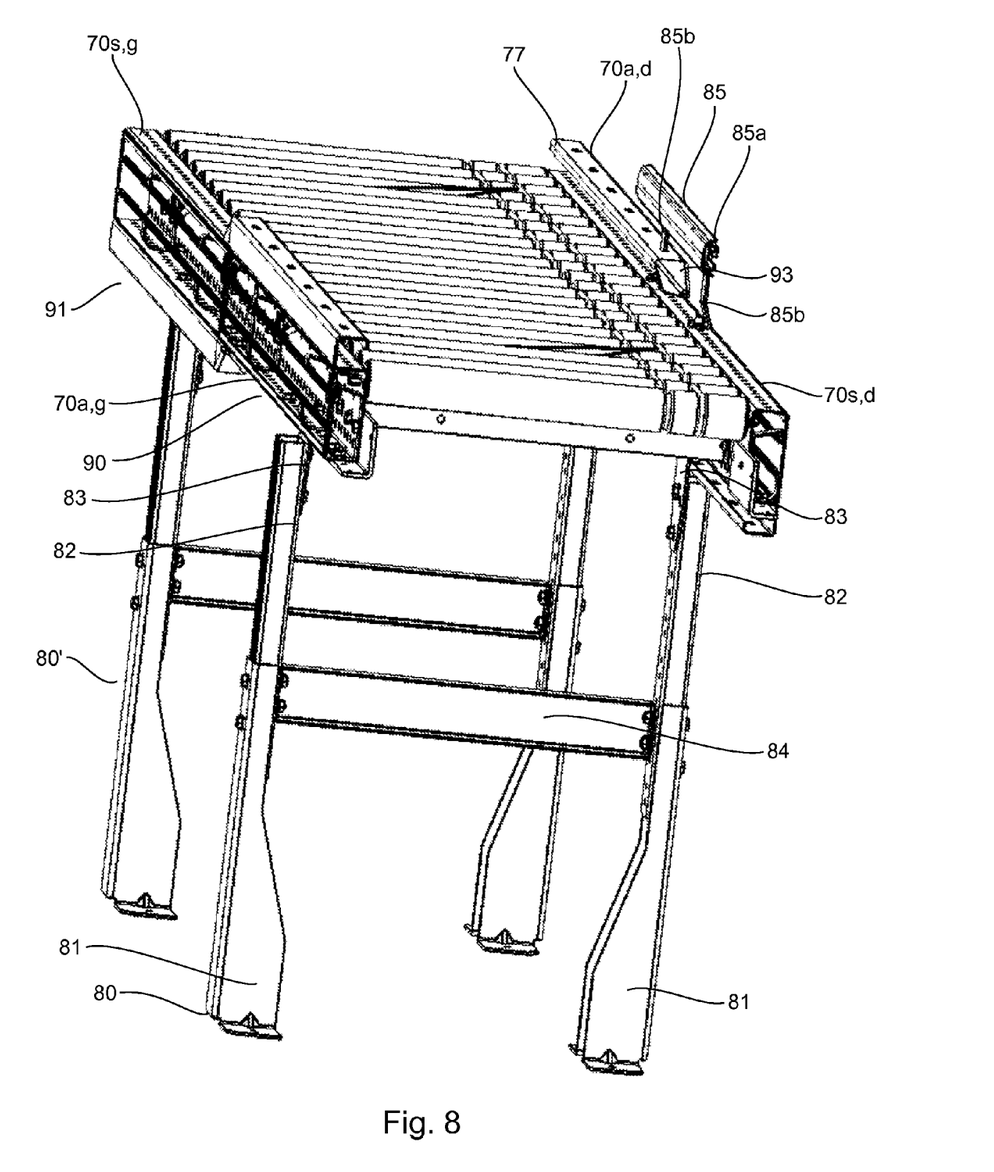
FIG. 8 is a top view in perspective of two adjacent conveyors mounted on leg structures and each comprising two longitudinal members according to FIG. 7, mounted in reverse directions (one fulfilling the guiding function and the other not fulfilling this function)

It must be noted that the two longitudinal members (left and right) of a same conveyor can be mounted either in the same direction (as in FIGS. 1 to 6) or in different directions (as in of FIG. 8).

Figure 7:
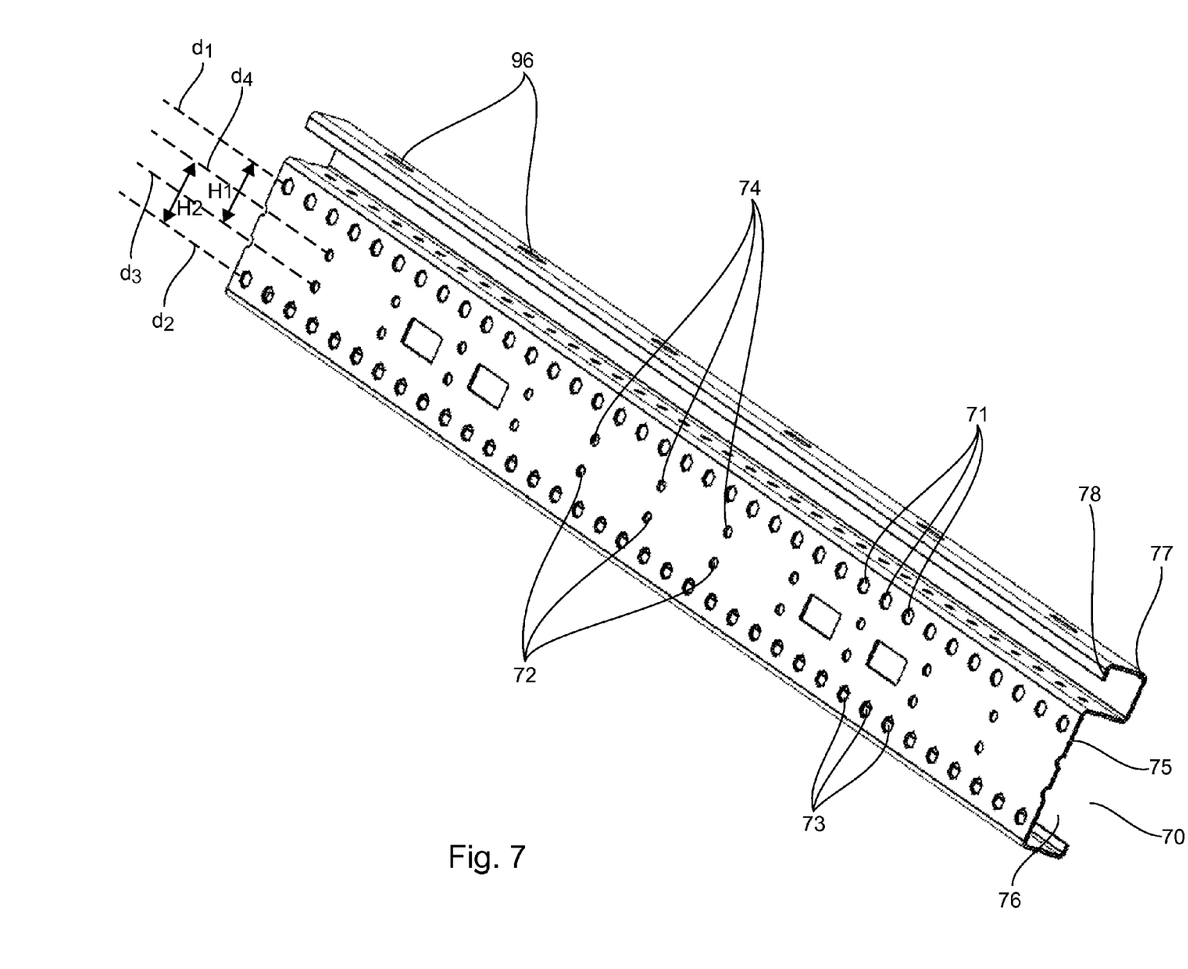
FIG. 7 is a view in perspective of a longitudinal member according to one particular embodiment of the invention.

First of all, referring to FIG. 7, we present one particular embodiment of the longitudinal member 70 according to the invention.

In this particular embodiment, the longitudinal member is a profile part comprising a main body 75, from which there extends a guiding element 77. This is for example a metal part obtained by a folding process.

In this example, the longitudinal member is rectilinear. But the present invention is not limited to this shape and can be applied to other shapes of longitudinal member (especially a bent shape).

The guiding element 77 comprises a guiding surface 78 playing the role of a side guide rail when the longitudinal member is mounted in the direction where it must fulfill the guiding function.

The main body 75 has a C-shaped profile defining a cavity 76 adapted to receiving cables and elements for driving the conveyor (electronic drive card for example).

The C-shaped profile comprises a central part, a first lateral arm extending substantially perpendicularly from a first end of the central part and the second lateral arm extending substantially perpendicularly from a second end of the central part. The guiding element 77 extends from the second lateral arm of the main body.

Figures 4, 5, 6:
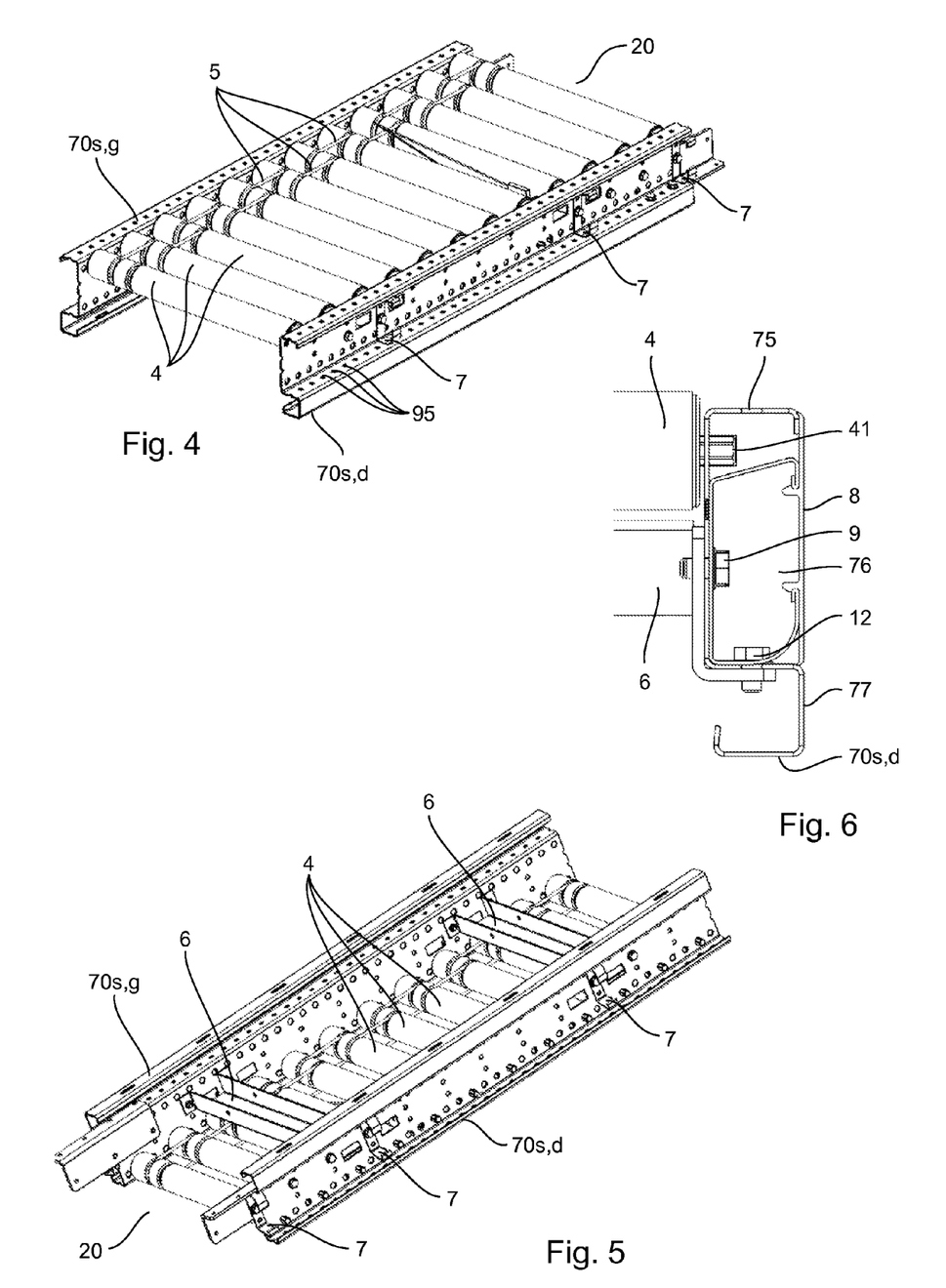
FIGS. 4 and 5 are two views (respectively a top view in perspective, and a bottom view in perspective) of a second example of a conveyor comprising two longitudinal members mounted so as to not fulfill a guiding function.
FIG. 6 is a side view of the right-hand longitudinal member of the conveyor of FIGS. 4 and 5.

The main body 75 (in the central part of the C-shaped profile) comprises different holes that lead into the cavity 76, and especially:
- holes 71 aligned in a line d1 (they are situated at a first predetermined distance H1' from the second lateral arm of the main body) and each adapted to receiving a shaft 41 of one of the rollers 4 when the longitudinal member is mounted so as to fulfill the guiding function (cf. FIGS. 1 to 3);
- holes 73 aligned with a line d2 (they are situated at a second predetermined distance H2' from the first lateral arm of the main body) and each adapted to receiving a shaft 41 of one of the rollers 4 when the longitudinal member is mounted so as not to fulfill the guiding function (cf. FIGS. 4 to 6);
- holes 72 aligned with a line d3 (the lines are situated at a third predetermined distance (H1+'H1) from the second lateral arm of the main body) and each adapted to receiving a fastening element 9 (notched-cap screw for example) of a cable-carrier hook 7 when the longitudinal member is mounted to fulfill the guiding function (cf. FIGS. 1 to 3);
- holes 74 aligned with a line d4 (they are situated at a fourth predetermined distance (H2'+H2) from the first lateral arm of the main body) and are each adapted to receiving a fastening element 9 for fastening a cable-carrier hook 7 when the longitudinal member is mounted so as not to fulfill the guiding function (cf. FIGS. 4 to 6).

Figure 9:
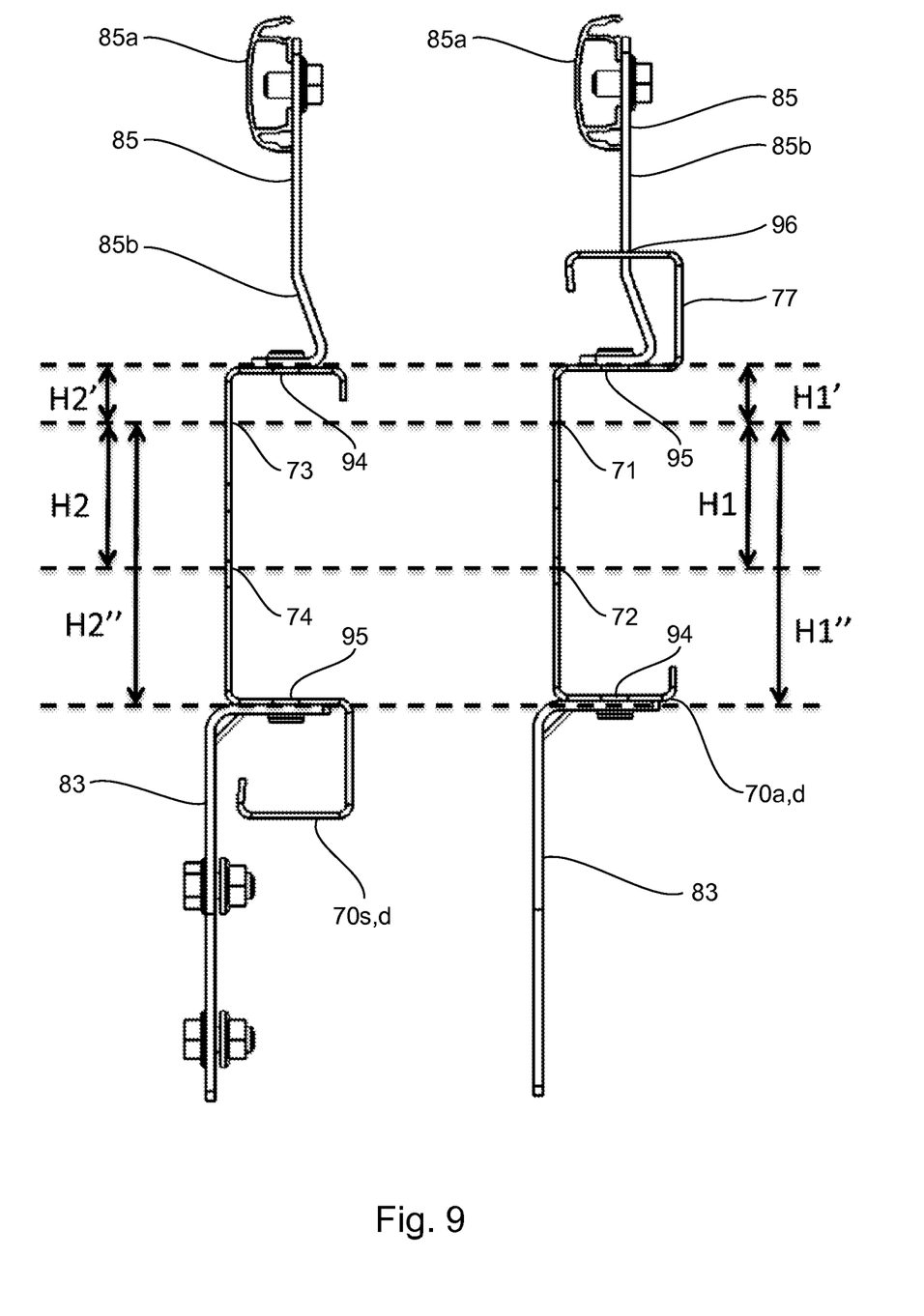
FIG. 9 illustrates three equalities between inter-hole distances of the longitudinal member of FIG. 7, ensuring various continuities (continuity for the covers, continuity for the attached guiding parts and continuity for the leg structures).

As illustrated in FIG. 9, the longitudinal member is reversible and has two mounting directions:
- a first direction (right-hand part of FIG. 9) in which the guiding element is situated above the main body; the cavity 76 opens opposite to the load-supporting elements; and each of the holes 71 of the first set can receive one end of one of the load-supporting elements;
- a second direction (left-hand part of FIG. 9) in which: the guiding element is situated beneath the main body: the cavity 76 opens opposite to the load-supporting elements and each of the holes 73 of the second set can receive one end of one of the load-supporting elements.

Figures 1, 2, 3:
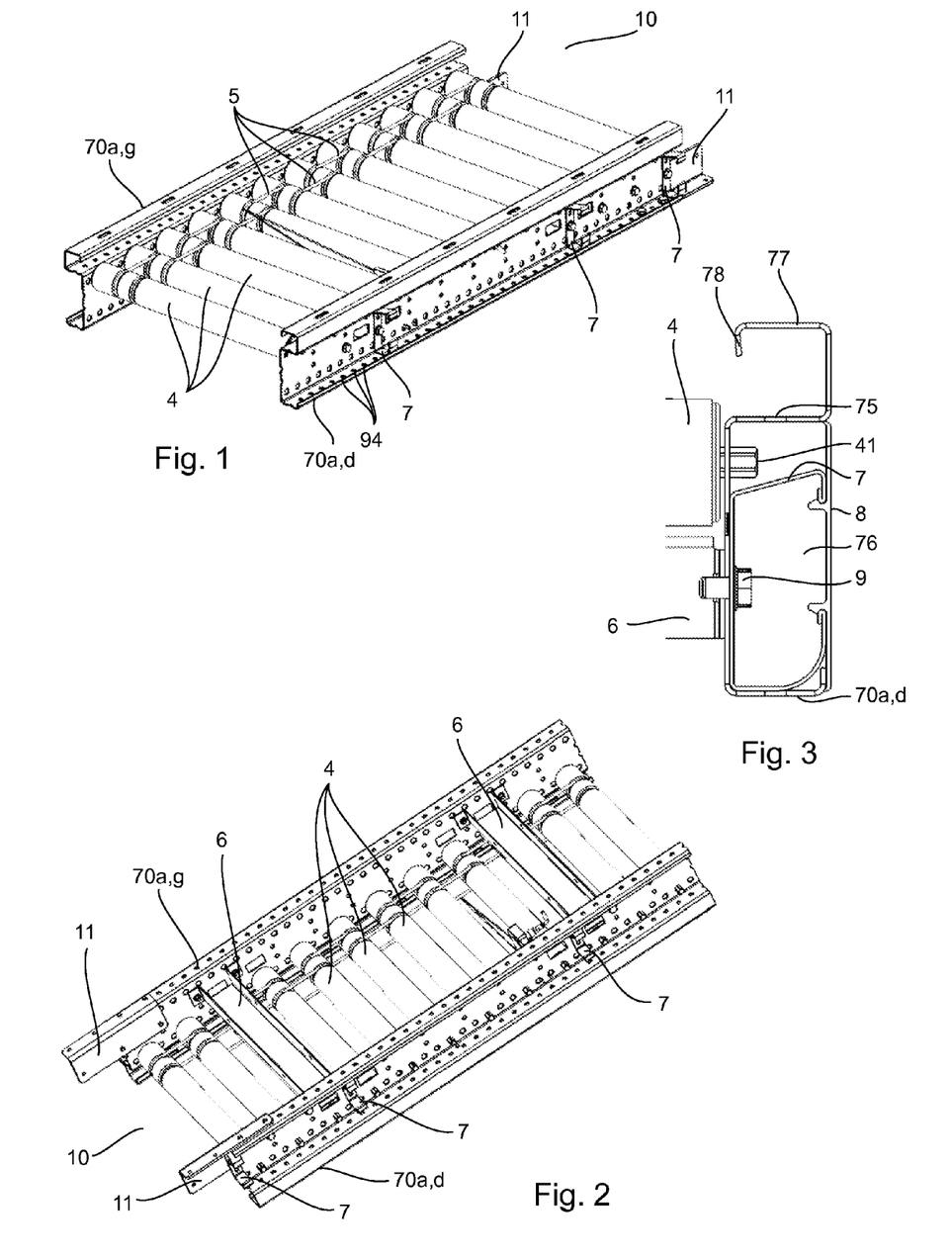
FIGS. 1 and 2 are two views (respectively a top view in perspective and a bottom view in perspective) of a first example of a conveyor according to the invention, comprising two longitudinal members mounted so as to fulfill a guiding function.
FIG. 3 is a side view of the right-hand longitudinal member of the conveyor of FIGS. 1 and 2.

FIGS. 1 to 3 show a first example of a conveyor 10 comprising two longitudinal members $70_{a,g}$ and $70_{a,d}$ both mounted to fulfill the guiding function.

For each longitudinal member, the guide element 77 is situated above the main body 75 and goes beyond a running surface of the rollers 4. More specifically, it is the guiding surface 78 (included in the guiding element 77) that acts as a side guide rail.

The shaft of each roller 4 penetrates one of the holes referenced 71 in FIG. 7.

FIGS. 1 and 2 (as well as FIGS. 4 and 5) also show straps 11, each of which enables two adjacent longitudinal members to be assembled. Each strap 11 is for example fastened with notched-cap screws 9, 12 to each of the longitudinal members.

The cavity 76 defined by the main body 75 (the profile of which is C-shaped) is open outwards and can receive cables and driving elements for driving the conveyor (not shown).

To facilitate the guiding of the cables, cable-carrier hooks 7 are situated in the cavity 76 of the main body 75. Each cable-carrier hook 7 is fastened to the main body 75 by a fastening element 9 (for example a notched-cap screw) via one of the holes referenced 72 of FIG. 7.

More specifically, in the example of FIGS. 1 to 3, each cable-carrier hook 7 is fastened to the main body 75 by a fastening element 9 which also has the function of fastening the longitudinal member with one of the cross-pieces or one of the straps 11.

As illustrated in FIG. 3 with respect to the particular case of the right-hand longitudinal member $70_{a,d}$ with an operational guidance function, a cover 8 (also called a cache or casing) closes the cavity 76 of the main body 75 in getting fastened (for example by being clipped on) to the free ends of the cable-carrier hooks 7 (these hooks being C-shaped).

FIGS. 4 to 6 show a second example of a conveyor 20 comprising two longitudinal members $70_{s,g}$ and $70_{s,d}$ both mounted so as not to fulfill the guiding function.

For each longitudinal member, the guiding element 77 is beneath the main body 75 and no part of the beam goes beyond the running surface of the rollers 4.

The shaft of each roller 4 penetrates one of the holes referenced 73 in FIG. 7.

As in the case of FIGS. 1 to 3, the cavity 76 defined by the main body 75 is opened outwards and can receive the cables and the driving elements of the conveyor (not shown). Indeed, the passage from the example of FIGS. 1 to 3 to that of the FIGS. 4 to 6 is done by turning around each longitudinal member (with a 180° rotation).

As in the case of FIGS. 1 to 3, in order to facilitate the guiding of the cables, cable-carrier hooks 7 are situated in the cavity 76 of the main body 75. Each cable-carrier hook 7 is fastened to the main body 75 by a fastening element 9 (for example a notched-cap screw) via one of the holes referenced 74 in FIG. 7.

Also, as in the case of FIGS. 1 to 3, a cover 8 closes the cavity 76 of the main body 75 in getting fastened (for example by being clipped on) to the free ends of the cable-carrier hooks 7 (this is illustrated in FIG. 6 through the particular case of the right-hand longitudinal member $70_{s,d}$ with the guidance function being non-operational).

FIG. 8 presents a top view in perspective of two adjacent conveyors 90, 91 mounted on two identical leg structures 80, 80'. Each of the two conveyors comprises two longitudinal members mounted in reverse (one fulfills the guidance function while the other does not):
- the conveyor 90 comprises a left-hand longitudinal member $70_{a,g}$ mounted so as to fulfill the guiding function and a right-hand longitudinal member $70_{s,d}$ mounted so as not to fulfill the guidance function;
- the conveyor 91 comprises a left-hand longitudinal member $70_{s,g}$ mounted so as not to fulfill the guidance function and a right-hand longitudinal member $70_{a,d}$ mounted so as to fulfill the guiding function.

FIG. 8 also shows junction parts 93 providing the interface (for reasons of security) between consecutive longitudinal members which are reverse mounted. These are for example semi-pyramidal plastic parts that fit into the hollow end of the guiding element 77.

Each leg structure comprises two units connected by a cross-piece 84 (or several cross-pieces depending on the height and/or rigidity desired for the set), each unit itself comprising a seat 81, a slideway 82 and a bracket 83 (these three parts being fixedly joined to one another, for example by screws and nuts). The bracket 83 is itself fastened to one of the longitudinal members by a fastening element (for example a screw) passing through a hole of the longitudinal member, and more specifically:
- one of the holes referenced 94 (see also FIG. 1) and situated on the lower part of the C-shaped profile of the body of the longitudinal member, when the longitudinal member is mounted to fulfill the guiding function (see right-hand part of FIG. 9);
- one of the holes referenced 95 (see also FIG. 4) and situated on the lower part of the C-shaped profile of the body of the longitudinal member, when the longitudinal member is mounted so as not to fulfill the guiding function (see left-hand part of FIG. 9).

The example of FIG. 9 also represents a guiding part 85 which is attached by the top to two adjacent longitudinal members $70_{s,d}$ and $70_{a,d}$. In one variant, each guiding part 85 can be attached by the top to a single longitudinal member.

In this example, the guiding part 85 comprises a guiding structural section 85a mounted on two supports 85b, for example by screws. The end of each support 85b is flat and fastened to one of the longitudinal members by a fastening element (for example a screw) passing through a hole of the longitudinal member and more specifically:
- one of the holes referenced 95 and situated on the upper part of the C-shaped profile of the body of the longitudinal member (in this case on the second lateral arm of the main body of the longitudinal member) when the longitudinal member is mounted to fulfill the guiding function (cf. right-hand part of FIG. 9);
- one of the holes referenced 94 and situated on the upper part of the C-shaped profile of the body of the longitudinal member (i.e. on the first lateral arm of the main body of the longitudinal member) when the longitudinal member is mounted so as not to fulfill the guiding function (cf. left-hand part of FIG. 9).

Thus, in the particular case illustrated by the FIGS. 8 and 9, the holes referenced 94 and those referenced 95 have a two-fold function. When the longitudinal member is mounted to fulfill the guiding function (cf. right-hand part of FIG. 9), one of the holes referenced 94 is used to fasten a bracket 83 (of the leg structure 80) to the lower part of the C-shaped profile of the body of the longitudinal member, and one of the holes referenced 95 is used to attach the guiding device 85 to the upper part of the C-shaped profile of the body of the longitudinal member. When the longitudinal member is mounted so as not to fulfill the guiding function (see left-hand part of FIG. 9), one of the holes referenced 95 is used to fasten a bracket 83 (with a leg structure 80) to the lower part of the C-shaped profile of the body of the longitudinal member and one of the holes referenced 94 is used to fasten a guiding device 85 to the upper part of the C-shaped profile of the body of the longitudinal member.

When the longitudinal member is mounted to fulfill the guiding function (see right-hand part of FIG. 9), the support 85b passes through a hole referenced 96 (see also FIG. 7) of the top part of the guiding element 77 integrated with the longitudinal member.

FIG. 9, already partially described here above, illustrates three equalities between inter-hole distances on the longitudinal member of FIG. 7, making it possible to carry out several continuities (continuity for the covers, continuity for the attached guiding parts and continuity for the leg structures).

The right-hand part of FIG. 8 shows a side view of the right-hand longitudinal member mounted to fulfill the guiding function $70_{a,d}$. The following distances are distinguished in this figure:
- the distance H1 between the straight line d1 of alignment of the holes 71 and straight line d3 of alignment of the holes 72 (see FIG. 7);
- the distance H1' between the straight line d1 of alignment for the holes 71 and a straight line of alignment of the holes 95;
- the distance H1" between the straight line d1 of alignment of the holes 71 and a straight line of alignment of the holes 94.

The left-hand part of FIG. 9 shows a side view of the right-hand longitudinal member mounted so as not to fulfill the guiding function $70_{s,d}$. The following distances are distinguished in this figure:
- the distance H2 between the straight line d2 of alignment of the holes 73 and the straight line d4 of alignment of the holes 74 (see FIG. 7);
- the distance H2' between the straight line d2 of alignment of the holes 73 and a straight line d4 of alignment of the holes 94;
- the distance H2" between the straight line d2 of alignment of the holes 73 and a straight line of alignment of the holes 95.

The equality "H1=H2" ensures continuity (no vertical offset and therefore surface continuity) between two covers 8, each attached to a longitudinal member of a pair of adjacent longitudinal members but mounted in reverse. This ensures that a cover 8 can be mounted so as to straddle two longitudinal members that are adjacent but mounted in reverse.

The equality "H1'=H2'" ensures continuity (no vertical offset) between two guiding parts 85, each attached to a longitudinal member of a pair of longitudinal members that are adjacent but mounted in reverse. This also ensures that a guiding part 85 can be attached so that it straddles two longitudinal members that are adjacent but mounted in reverse.

The equality "H1"=H2"" ensures continuity (no vertical offset) between two leg structures 80, each attached to a longitudinal member of a pair of longitudinal members that are adjacent but mounted in reverse.

At least one exemplary embodiment provides a novel type of longitudinal member that reduces the time taken to assemble conveyors, whether these conveyors are implemented with the guiding function or without it.

At least one exemplary embodiment provides a novel type of longitudinal member that reduces the costs of manufacture and storage.

At least one exemplary embodiment provides a novel type of longitudinal member that does not require any additional mechanical element of the cable rack or cable-supporting chute type.

At least one exemplary embodiment provides a novel type of longitudinal member that enables the appearance of the conveyors to be easily personalized.

Although the present disclosure has been described with reference to one or more examples, workers skilled in the art will recognize that changes may be made in form and detail without departing from the scope of the disclosure and/or the appended claims.

The invention claimed is:

1. An apparatus comprising:
a longitudinal member for a load conveyor, comprising:
- a main body comprising a plurality of holes each adapted to receiving one end of a load-supporting element, wherein the main body possesses a C-shaped profile defining a cavity configured to receive at least one cable and/or at least one element for driving the conveyor, said C-shaped profile comprising a central part, a first lateral arm extending substantially perpendicularly from a first end of the central part and a second lateral arm extending substantially perpendicularly from a second end of the central part; and
- a guiding element extending from the second lateral arm of the main body;
- wherein the main body comprises, in the central part of the C-shaped profile:
- a first set of holes leading into the cavity and situated at a first predetermined distance from the second lateral arm of the main body; and
- a second set of holes leading into the cavity and situated at a second predetermined distance from the first lateral arm of the main body;
and wherein the longitudinal member is reversible and has two mounting directions:
- a first direction in which: the guiding element is situated above the main body; the cavity opens opposite to the load-supporting elements; and each of the holes of the first set can receive one end of one of the load-supporting elements; and
- a second direction in which: the guiding element is situated below the main body; the cavity opens out opposite to the load-supporting elements; and each of the holes of the second set can receive one end of one of the load-supporting elements.

2. The apparatus according to claim 1, wherein the longitudinal member is a profile part comprising the main body and the guide element.

3. The apparatus of claim 1, comprising:
an assembly comprising:
the longitudinal member; and
a plurality of cable-carrying hooks fastened to the longitudinal member, inside the cavity, and wherein the main body of the longitudinal member comprises, in the central part of the C-shaped profile:
- a third set of holes, leading into the cavity, situated at a third predetermined distance from the second lateral arm of the main body, and each configured to receive an element for fastening one of the cable-wearing hooks when the longitudinal member is mounted in the first direction; and
- a fourth set of holes, leading into the cavity, situated at a fourth predetermined distance from the first lateral arm of the main body, and each configured to receive an element for fastening one of the cable-carrying hooks when the longitudinal member is mounted in the second direction.

4. The apparatus according to claim 3, wherein at least one of the cable-carrier hooks is fastened to the longitudinal member by a fastening element also serving to fasten the longitudinal member to a cross-piece or a strap.

5. The apparatus according to claim 3, comprising at least one cover adapted so as to get fastened to the plurality of cable-carrier hooks and close the cavity.

6. The apparatus according to claim 3, wherein the holes of the first set are aligned with a first straight line, the holes of the second set are aligned with a second straight line, the holes of the third set are aligned with a third straight line, the holes of the fourth set are aligned with a fourth straight line, and wherein the distance between the first and third straight lines is equal to the distance between the second and fourth straight lines.

7. The apparatus according to claim 1, comprising:
an assembly comprising:
the longitudinal member; and
at least one guiding part fastened to the longitudinal member,
and wherein the main body of the longitudinal member comprises:
- in the second lateral arm of the main body, a fifth set of holes leading into the cavity, and each configured to receive an element for fastening said at least one guiding part, attached by the top to the longitudinal member, when the longitudinal member is mounted in the first direction; and
- in the first lateral arm of the main body, a sixth set of holes leading into the cavity and each configured to receive an element for fastening said at least one guiding part, attached by the top to the longitudinal member when the longitudinal member is mounted in the second direction.

8. The apparatus according to claim 7, wherein the holes of the first set are aligned with a first straight line, the holes of the second set are aligned with a second straight line, the holes of the fifth set are aligned with a fifth straight line, the holes of the sixth set are aligned with a sixth straight line,
and wherein the distance between the first and fifth straight lines is equal to the distance between the second and sixth straight lines.

9. The apparatus according to claim 1, comprising:
an assembly comprising:
the longitudinal member; and
at least one leg structure fastened to the longitudinal member;
and wherein the main body of the longitudinal member comprises:
- in the first lateral arm of the main body, a seventh set of holes leading into the cavity and each configured to receive an element for fastening said at least one leg structure, attached by the underside to the longitudinal member, when the longitudinal member is mounted in the first direction; and
- in the second lateral arm of the main body, an eighth set of holes, leading into the cavity and each configured to receive a fastening element for fastening said at least one leg structure, attached by the underside to the longitudinal member, when the longitudinal member is mounted in the second direction.

10. The apparatus according to claim 9, wherein the holes of the first set are aligned with a first straight line, the holes of the second set are aligned with a second straight line, the holes of the seventh set are aligned with a seventh straight line, the holes of the eighth set are aligned with an eighth straight line,
and wherein the distance between the first and seventh straight lines is equal to the distance between the second and eighth straight lines.

11. The apparatus according to claim 7, further comprising at least one leg structure fastened to the longitudinal member;
wherein the main body of the longitudinal member comprises:
- in the first lateral arm of the main body, a seventh set of holes leading into the cavity and each intended to receive an element for fastening said at least one leg structure, attached by the underside to the longitudinal member, when the longitudinal member is mounted in the first direction; and in the second lateral arm of the main body, an eighth set of holes, leading into the cavity and each intended to receive a fastening element for fastening said at least one leg structure, attached by the underside to the longitudinal member, when the longitudinal member is mounted in the second direction; and wherein the sixth set of holes and the seventh set of holes coincide and the fifth set of holes and the eighth set of holes coincide.

* * * * *